US012053115B2

(12) United States Patent
Banning et al.

(10) Patent No.: US 12,053,115 B2
(45) Date of Patent: Aug. 6, 2024

(54) BEVERAGE BREWING FUNNEL WITH PROTRUDING FINS ON FLOOR RIBS

(71) Applicant: BUNN-O-MATIC CORPORATION, Springfield, IL (US)

(72) Inventors: Jason M. Banning, Springfield, IL (US); Jane Boehler, Springfield, IL (US)

(73) Assignee: BUNN-O-MATIC CORPORATION, Springfield, IL (US)

( * ) Notice: Subject to any disclaimer, the term of this patent is extended or adjusted under 35 U.S.C. 154(b) by 709 days.

(21) Appl. No.: 16/988,323

(22) Filed: Aug. 7, 2020

(65) Prior Publication Data

US 2021/0045571 A1  Feb. 18, 2021

Related U.S. Application Data

(60) Provisional application No. 62/886,073, filed on Aug. 13, 2019.

(51) Int. Cl.
*A47J 31/44* (2006.01)
(52) U.S. Cl.
CPC .................................. *A47J 31/446* (2013.01)
(58) Field of Classification Search
CPC ...... A47J 31/446; A47J 31/402; A47J 31/525; A47J 31/5253; A47J 31/467; A47J 31/06; A47J 31/44; A47J 31/0626

USPC .......... 99/295, 299, 304, 306, 315, 317, 323
See application file for complete search history.

(56) References Cited

U.S. PATENT DOCUMENTS

| | | | |
|---|---|---|---|
| 4,963,262 A * | 10/1990 | Johnstone | A47J 31/06 210/477 |
| 6,250,209 B1 * | 6/2001 | Pope | A47J 31/0631 210/477 |
| 6,481,340 B2 | 11/2002 | Pope | |
| 8,216,464 B2 | 7/2012 | Brewington | |
| 2017/0181566 A1 * | 6/2017 | D'Amico | A47J 31/0626 |

* cited by examiner

*Primary Examiner* — Phuong T Nguyen
(74) *Attorney, Agent, or Firm* — Barnes & Thornburg LLP

(57) ABSTRACT

A beverage brewing funnel for conforming a structure of a filter paper inserted therein is disclosed. The beverage brewing funnel includes a frame have a base, a drain aperature formed in a bottom surface of the base, and a wall extending upwardly from the base and defining a mouth. The beverage brewing funnel also includes ribs extending away from the wall and spaced apart from one another. Each rib has a portion radially and inwardly positioned along the wall. One of the portions includes a fin projecting upwardly and prominently from the portion. The fins form a raised central area relative to the frame.

11 Claims, 7 Drawing Sheets

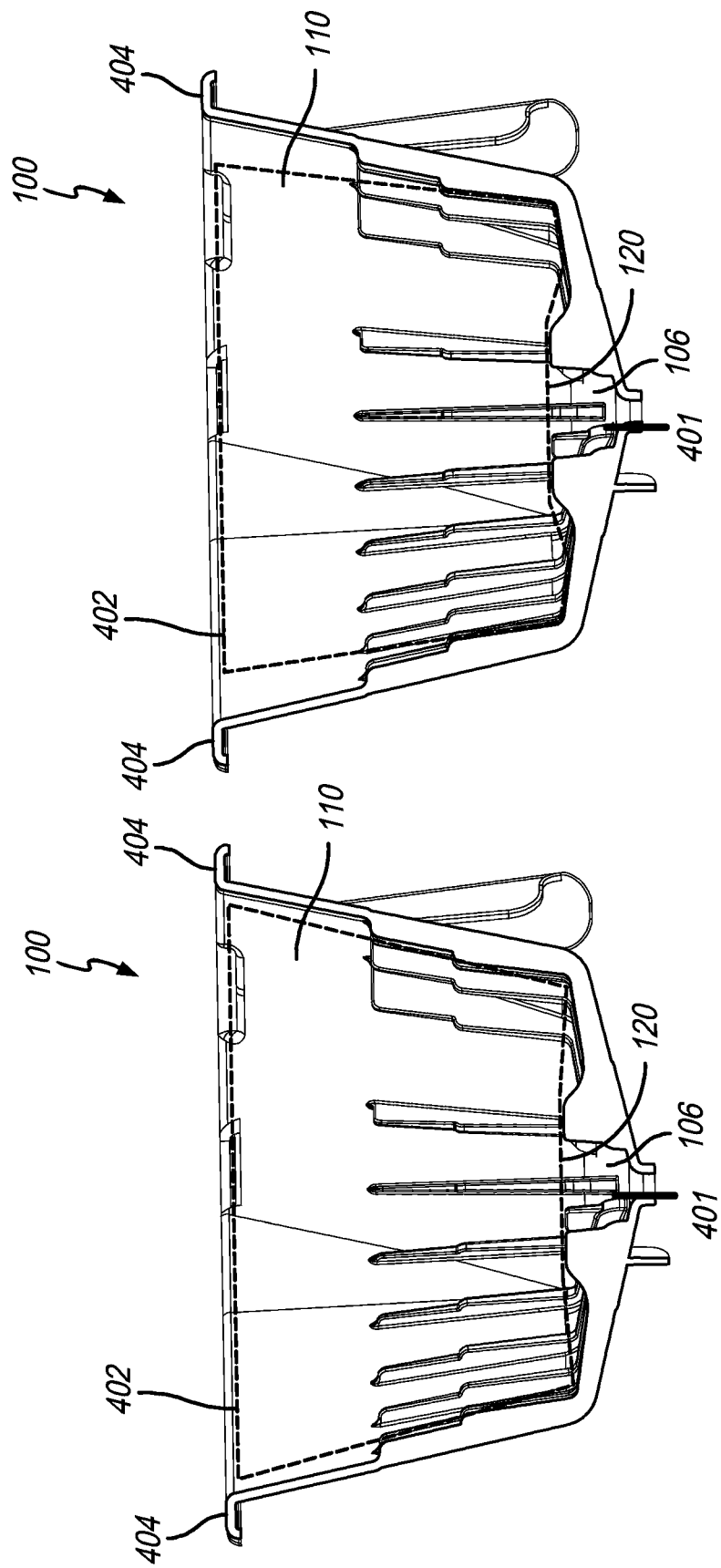

BEVERAGE BREWING FUNNEL WITH PROTRUDING FINS ON FLOOR RIBS

CROSS-REFERENCE TO RELATED APPLICATION

This application claims priority to U.S. Provisional Patent Application No. 62/886,073, filed Aug. 13, 2019, disclosure set forth in this application is incorporated herein by reference in its entirety.

BACKGROUND

The present disclosure generally relates to a beverage brewing funnel, and more specifically, to a beverage brewing funnel having protruding fins molded into floor ribs thereon.

Many beverage brewing devices, such as coffee makers, generally include a funnel structure to provide support for a brewing filter. In particular, the funnel structure supports the brewing filter such that ground coffee is retained during the brewing process. Typically, the brewing filter is a disposable paper formed of a porous material.

One issue regarding such funnels includes providing adequate structural support for the brewing filter during the brewing process. When brewing coffee in the brewing device, a dry brewing filter is placed within the funnel, and a given amount of ground coffee is deposited into the brewing filter. Although the brewing filter may initially retain its structure, the outer and generally upwardly extending wall of the brewing filter may potentially collapse (e.g., slump or fold over) within the brewing funnel as water is dispersed from a spray head above the ground coffee and into the filter. In such a case, the quality and consistency of the resulting coffee may be affected due to water being unevenly distributed among the coffee grounds.

Although a manufacturer of the brewing device can design or recommend a particular brewing filter that is specifically sized and dimensioned to avoid this issue, some individuals may opt to use brewing filters having sizes and dimensions that differ from those recommended by the manufacturer. However, these differing brewing filters may have dimensions that are unsuited for the brewing device. For example, some brewing filters may have a smaller diameter in the filter base, which may increase the likelihood of collapse and yield an undesired outcome.

BRIEF DESCRIPTION OF THE DRAWINGS

FIGS. 4 and 5 depict example instances of a brewing process in which a brewing filter is placed within the brewing funnel over the protruding fins molded into floor ribs thereon;

DETAILED DESCRIPTION

Figure 1:
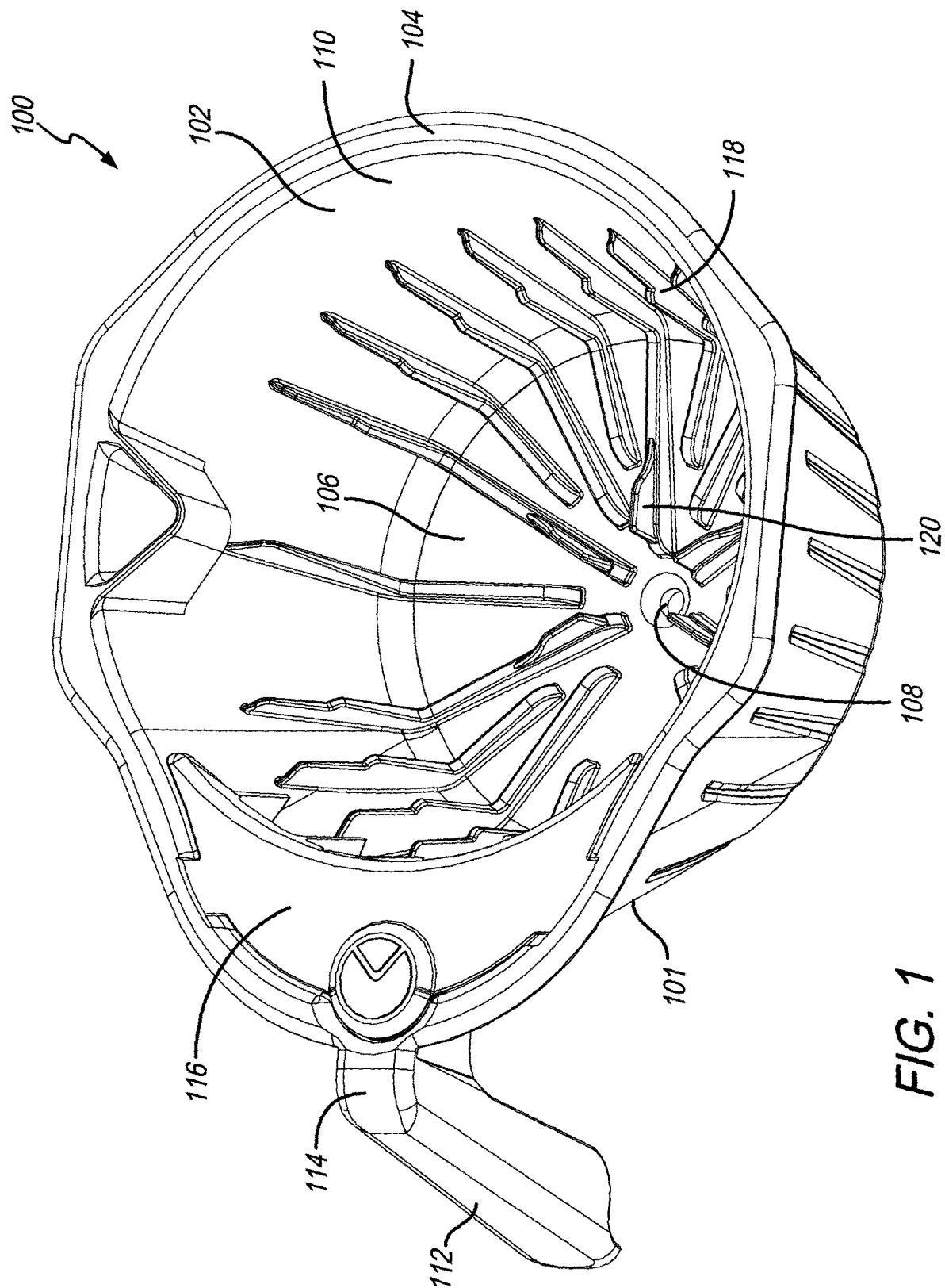
FIG. 1 is a perspective view of a beverage brewing funnel having protruding fins molded into floor ribs thereon according to an embodiment of the present disclosure.

Referring now to FIG. 1, a beverage brewing funnel 100 is shown in perspective view, according to an embodiment of the present disclosure. Illustratively, the brewing funnel 100 has a generally frustoconical shaped frame 101 with a top mouth opening 102 defined by a generally annular lip 104. The frame 101 defines a base 106. A sidewall 110 generally continuously extends around the brewing funnel 100 and the annular lip 104, extending upwardly from the base 106 and defining the opening 102. Further, as shown, a drain aperture 108 is formed in a bottom surface of the base 106. A handle 112 is provided on an outside surface of the sidewall 110 and may be attachable to the frame 101 via a connector 114 positioned on an end of the annular lip 104. As further shown, a splash guard 116 is connectable and locks to the brewing funnel 100 by a portion of the annular lip 104.

As shown, the brewing funnel 100 includes a number of raised ribs 118 formed within the sidewall 110 and spaced apart relative to one another. The ribs 118 extend from the base and define the sidewall 110. Each rib has a portion radially and inwardly positioned along the sidewall 110 and extending towards the center of the base 106. The raised ribs 118 provide a spaced dimension between the bottom of the interior surface of the brewing funnel 100 and top surface of the raised ribs 118. Generally, the ribs 118 provide a support for a brewing filter that is filled with a brewing substance, such as ground coffee.

Figure 2:
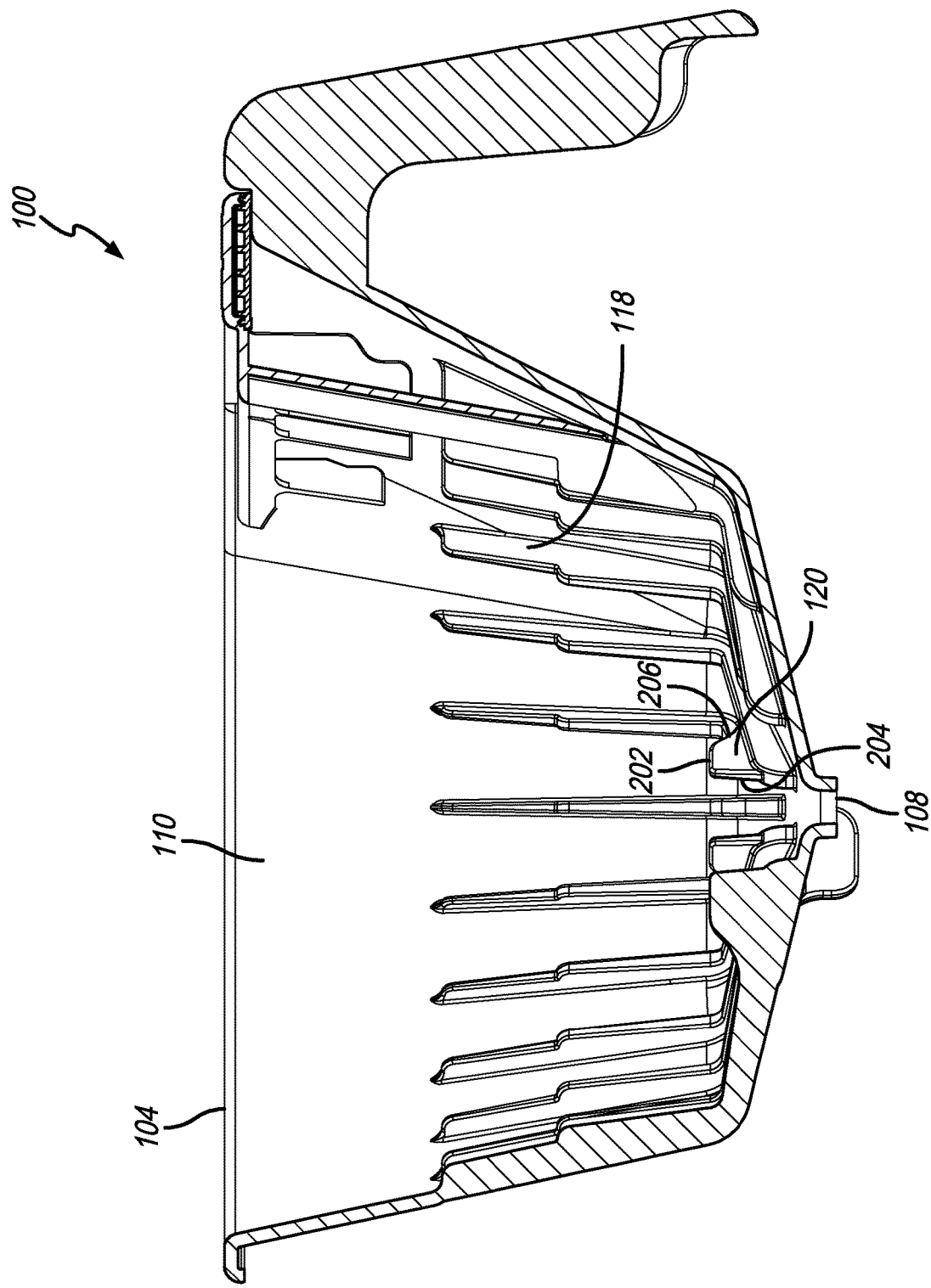
FIG. 2 is a partial side view of the beverage brewing funnel in which a portion of the side wall has been removed.

Further, illustratively, a number of the ribs 118 may include a raised fin 120 protruding from a portion of the rib 118. More particularly, the rib 118 has a portion radially and inwardly positioned along the wall, and the respective fin 120 is molded into the portion. Referring now to FIG. 2, a partial side view of the brewing funnel 100 is presented to further describe the fins 120. In an embodiment, each fin 120 incorporates at least three different surfaces to prevent a collapse (e.g., a slumping or folding over) of a brewing filter inserted within the brewing funnel 100 during a brewing process.

More particularly, each illustrative fin 120 provides a generally horizontal plateau 202 at the top of the fin 120. The plateau 202 provides a relatively prominent central structure in the brewing funnel 100. Further, as illustrated, the fin 120 provides a generally steep side 204. The steep side 204 is generally vertically oriented relative to a central axis extending through a drain hole or an acute angle relative to the axis. This arrangement assists in draining fluid (e.g., water, brewed coffee) off the surfaces throughout the brewing process. Further illustratively, the fin 120 includes a generally low angle slope 206 extending between the respective rib 118 and the plateau 202. The configuration of the aforementioned surfaces yields a relatively pronounced geometry for each fin 120.

Figure 3:
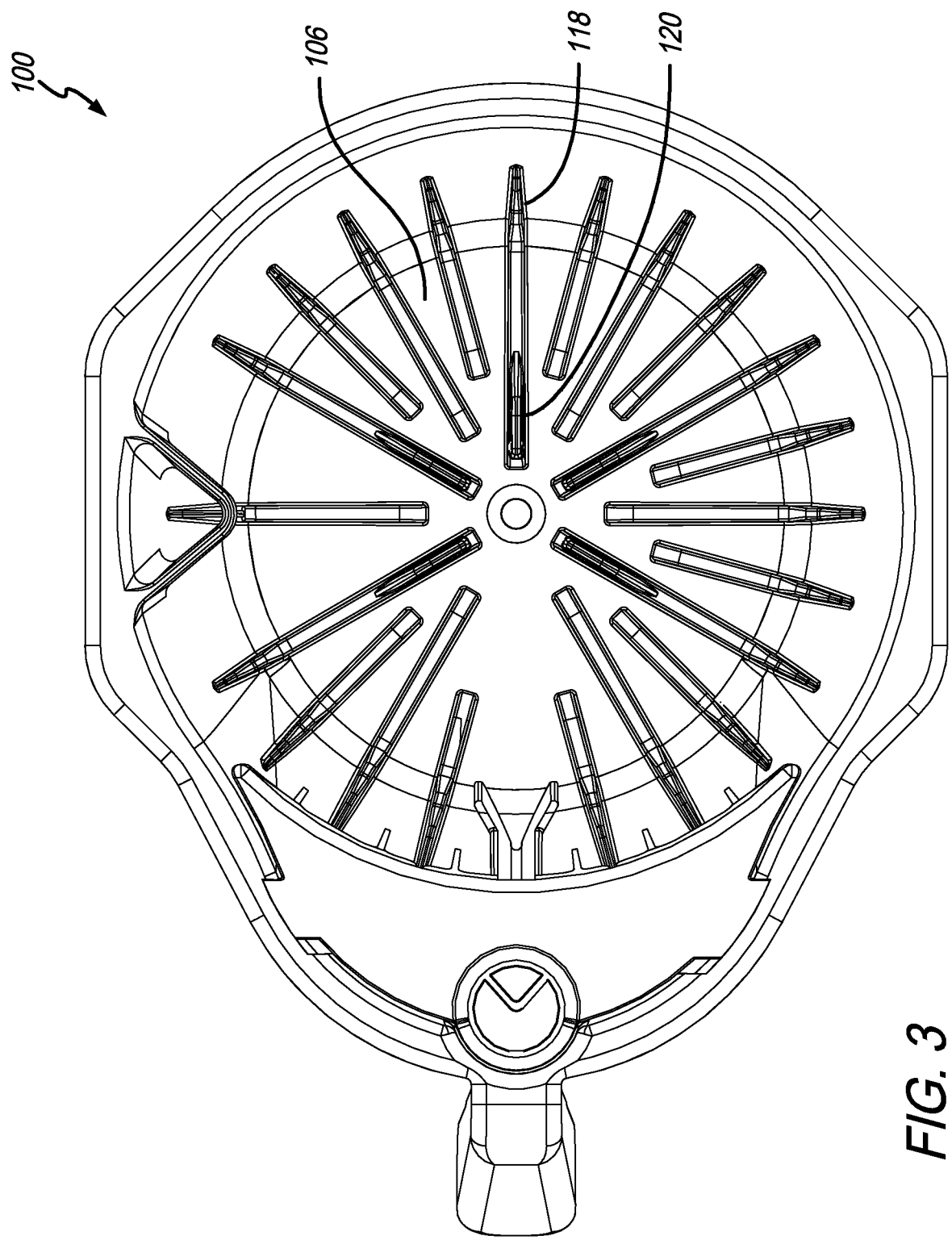
FIG. 3 is an elevational view of the beverage brewing funnel.

Referring now to FIG. 3, an overhead view of the beverage brewing funnel 100 depicts the geometry formed by the series of fins 120 on a number of the ribs 118. In series, the fins 120 provide a prominently raised area towards the center of the base 106. Specifically, the fins 120 provide a segmented structure that forms a generally cylindrical shape over which a brewing filter may be supported structurally.

Further, as shown, the formed geometry provides a raised central area that defines a consistent and raised inner diameter for a brewing filter that is placed within the brewing funnel 100. This is due to a retention of the central area of the brewing filter on the fins 120. Advantageously, this arrangement allows for brewing filters of variable sizes and dimensions (e.g., those filters having sizes and dimensions that differ from a manufacturer recommendation for the brewing funnel 100) to be placed therein. Specifically, the fins 120 provide an increased vertical dimension that promotes the distribution of coffee away from the centered area within the brewing funnel 100. Further, the relatively uniform distribution of the brewing filter has a tendency to avoid irregularities or gaps in the distribution of a pleated structure of the filter and thus reduce the potential for filter collapse.

In practice, the beverage brewing funnel 100 may be placed into a beverage brewing device (not shown). The annular lip 104 allows the brewing funnel 100 to be removably placed and supported within the brewing device. Referring now to FIG. 4, an example of a placement of a dry brewing filter 402 being inserted within the brewing device 100 is shown. In this example, assume that the brewing filter 402 is a paper brewing filter of a porous material. As shown, the brewing filter 402 sits on the base 106. More particularly, the base of the brewing filter 402 sits atop the fins 120, while the sides of the filter 402 rest along the sidewall 110. Illustratively, when placed atop the fins 120, a central area 401 of the base of the filter 402 slightly protrudes from the filter 402. Doing so provides a lift to the vertical wall of the filter 402, causing the filter 402 to be less likely to collapse regardless of the amount of brewing material within the filter 402 as water is poured therein. As a result, even with less brewing material within the filter 402, the lift provides the filter 402 a bias that allows the wall to remain relatively vertical.

In such an example, an individual adds ground coffee to the filter 402. The ground coffee is carried on top of the base of the filter 402. As the individual inserts the brewing funnel 100 in the brewing device, outwardly extending flanges 404 on the side of the funnel 100 engage corresponding channels defined by rails (not shown). The dimension of the channel relative to the flanges 404 results in a relatively conformal engagement to retain the funnel 100 in place during the brewing process and carry the weight of the water and brewed beverage by the rails. Inserting the flanges 404 between the rails cause a degree of vibration which generally settles and distributes the coffee in the filter 402.

Referring now to FIG. 5, a result of the brewing process on the filter 402 is shown. Specifically, in this example, once the brewing process is initiated, water is distributed through a spray head of the brewing device (not shown) in a shower pattern over the ground coffee. As the water accumulates in the filter 402, the water causes a degree of surface contact with the plateaus 202. As a result, the brewing filter 402 may adhere atop the fins 120 to a degree. As the water spreads out from the central area of the brewing filter 402, the water will form a circular puddle against the filter 402 before filtering through. Further, the puddle generally and evenly presses the brewing filter 402 downwardly off the edges of the raised central area 401 to generally and uniformly distribute the paper across the bottom of the funnel and on top of the funnel ribs.

Continuing the example, the water running off the raised central area 401 also has a tendency to distribute the ground coffee outwardly to the annular corner of the interior of the funnel 100 defined between the base 106 and the sidewall 110 extending upwardly therefrom. As a result, a collection of coffee outwardly away from the central area 401 has a tendency to provide support in the annular area of the funnel 100, e.g., as water wicks upwardly from the base 106 along the sidewall 110. Further as a result, as the ground coffee floats on top of the brewing filter 402 until being wetted, the brewing filter has a tendency to push against the sidewall 110, providing support for the filter 402. Further, after an initial wetting and floating of the ground coffee, the ground coffee has a tendency to become saturated and swell slightly as the coffee emits carbon dioxide from the brewing process. The resulting increase in volume will also tend to push the filter 402 against the sidewall 110. In effect, the mechanics relating to the wetted coffee grounds and wetted brewing filter 402 results in a degree of attraction of the coffee and consequently the filter 402 to the sidewalls 110. Doing so results in a relatively even distribution of ground coffee within the brewing filter 402 as well as support for the filter 402 to prevent collapse of the filter 402 inside the funnel 100. By providing an outward bias motion for a long enough duration, the filter 402 may eventually conform to a desired position and shape, regardless of the size and dimension of the filter 402.

Figure 6:
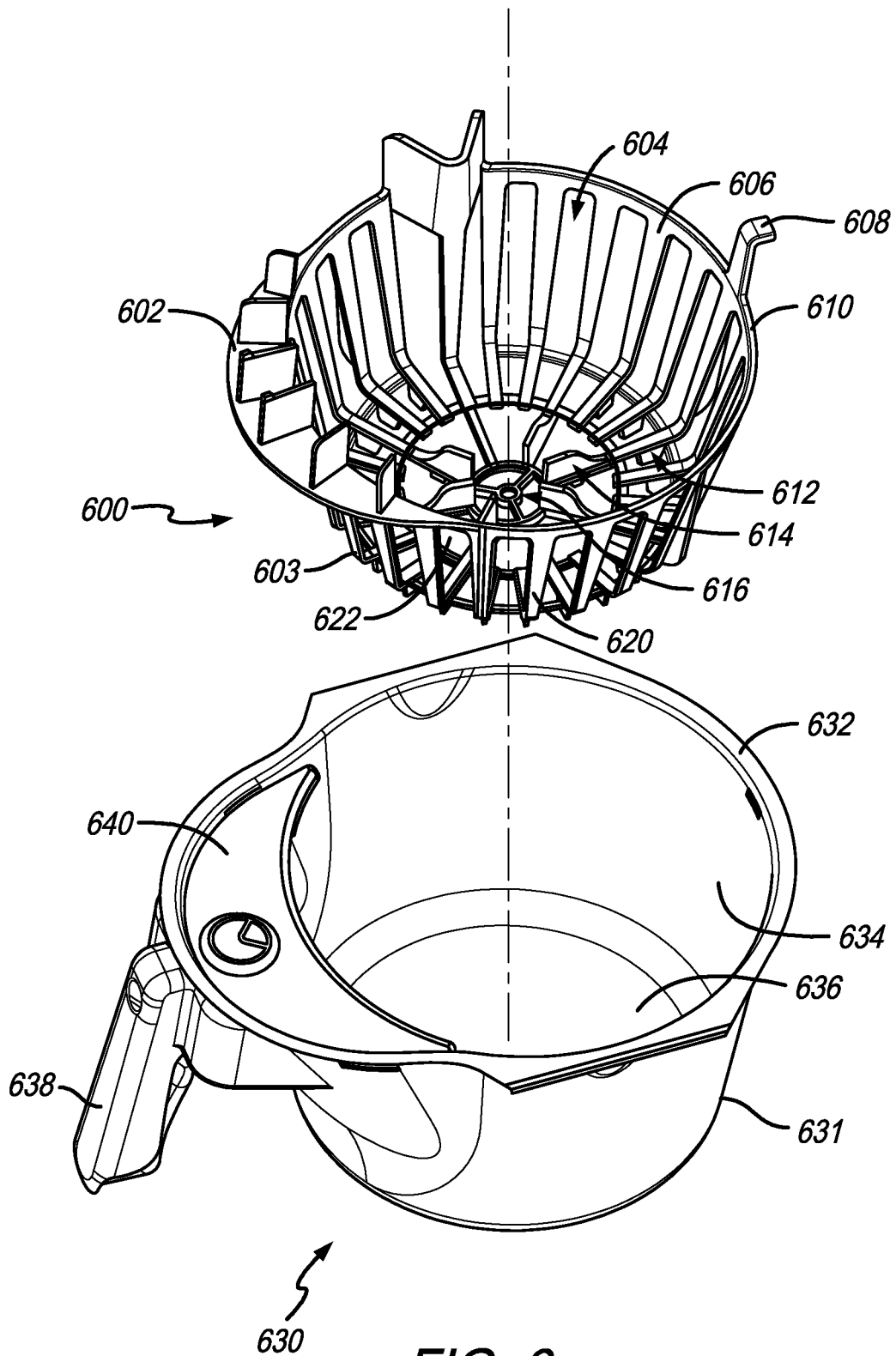
FIG. 6 is an exploded perspective view of a beverage brewing funnel showing a filter structure nestable inside of the brewing funnel according to another embodiment of the present disclosure.

In some embodiments, a structure having floor ribs with protruding fins may be nested within a funnel structure to separate a filter from the floor and walls of a funnel. FIG. 6 shows such an additional embodiment of the present disclosure. Particularly, FIG. 6 illustrates a brewing funnel structure 600 that is nestable within a brewing funnel 630. In some embodiments, the brewing funnel structure 600 may be of a molded plastic material that is smaller in dimension relative to the brewing funnel 630. Further, in some embodiments, the brewing funnel 630 may be of a stainless steel material.

Illustratively, the brewing funnel 630 has a generally frustroconical shaped frame 631 with a top mouth opening defined by a generally annular lip 632. The frame 631 defines a base 636. A sidewall 634 generally continuously extends around the brewing funnel 630 and the annular lip 632, extending upwardly from the base 636 and defining the opening. Further, a drain aperture (not shown) is formed in a bottom surface of the base 636. A handle 638 is provided on an outside surface of the sidewall 634 and may be attachable to the frame on an end of the annular lip 632. As further shown, a splash guard 640 is connectable and locks to the brewing funnel 630 by a portion of the annular lip 632.

The brewing funnel structure 600 has a generally frustroconical shaped 603 with a top mouth opening defined by a generally annular lip 610. The frame 603 defines a base 622. A wall 606 generally continuously extends around the structure 600 and the annular lip 610. Further, as shown, the a drain aperture 616 is formed in a bottom surface of the base 622. A splashguard connector 602 includes multiple tabs for insertion into slots (not shown) of a splashguard 640 of the brewing funnel 630.

The wall 606 is defined by a plurality of ribs 612 formed within, which extend upward and are spaced apart to define open spaces 604 that make up the wall 606. Each rib 612 has a portion radially and inwardly positioned along the wall 606 and extending towards the center of the base 622. The ribs 612 provide a spaced dimension between the bottom of the interior surface of the structure 600 and the top surface of the raised ribs 612 provide a support for seating a brewing filter that is filled with a brewing substance. Further, as stated, the brewing funnel structure 600 may be seated atop the funnel 630. When a brewing filter is placed within the funnel structure 600, contact of the filter remains with the funnel structure 600. That is, the placement of the funnel structure 600 within the brewing funnel 630 causes a degree of separation between the filter and the brewing funnel 630.

Further, illustratively, a number of the ribs 612 may each include a raised fin 614 protruding from a portion of the rib 612. More particularly, the rib 612 has a portion radially and inwardly positioned along the wall, and the respective fin 614 is molded onto the portion. The raised fins 614 allow for brewing filters of various sizes and dimensions to be usable with the brewing funnel 630. Whereas the brewing funnel 100 includes raised ribs molded thereon with fins 120 protruding therefrom, the brewing funnel 630, by contrast, lacks defined floor ribs on the base 636.

Figure 7:
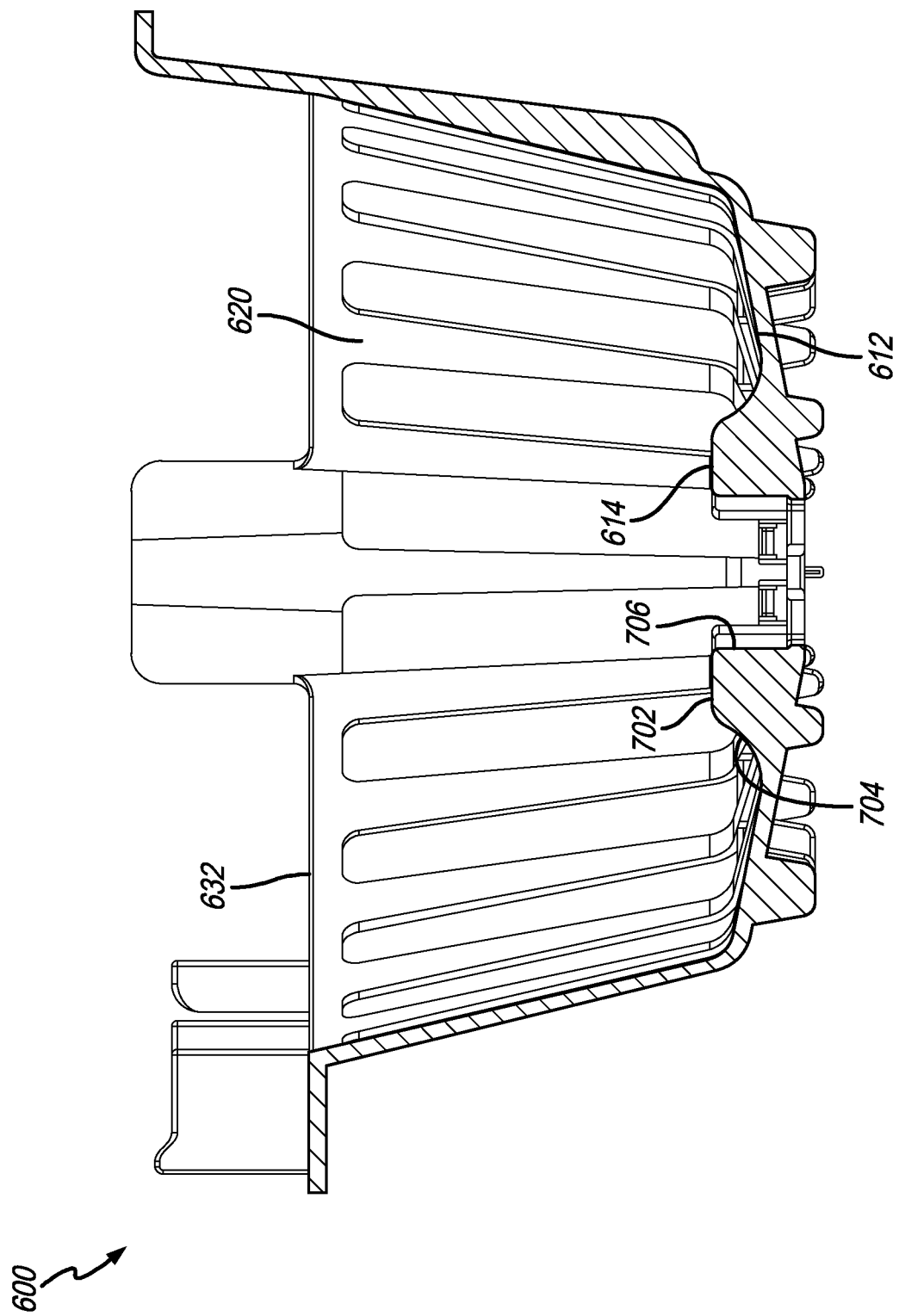
FIG. 7 is a partial cross-sectional view of the filter structure in which a portion of the side wall has been removed.

Referring now to FIG. 7, a partial side view of the brewing funnel structure 600 is presented to further describe the fins 614. In an embodiment, each fin 614 incorporates at least three different surfaces to prevent a collapse (e.g., a slumping or folding over) of a brewing filter inserted within the brewing funnel structure 600 (which itself is nested within the brewing funnel 630) during a brewing process.

More particularly, each illustrative fin 614 provides a generally horizontal plateau 702 at the top of the fin 614. The plateau 702 provides a relatively prominent central structure in the brewing funnel structure 600. Further, as illustrated, the fin 614 provides a generally steep side 706. The steep side 706 is generally vertically oriented relative to a central axis extending through a drain hole or an acute angle relative to the axis. This arrangement assists in draining fluid (e.g., water, brewed coffee) off the surfaces throughout the brewing process. Further illustratively, the fin 614 includes a generally low angle slope 704 extending between the respective rib 612 and the plateau 702. The configuration of the aforementioned surfaces yields a relatively pronounced geometry for each fin 614.

Figure 8:
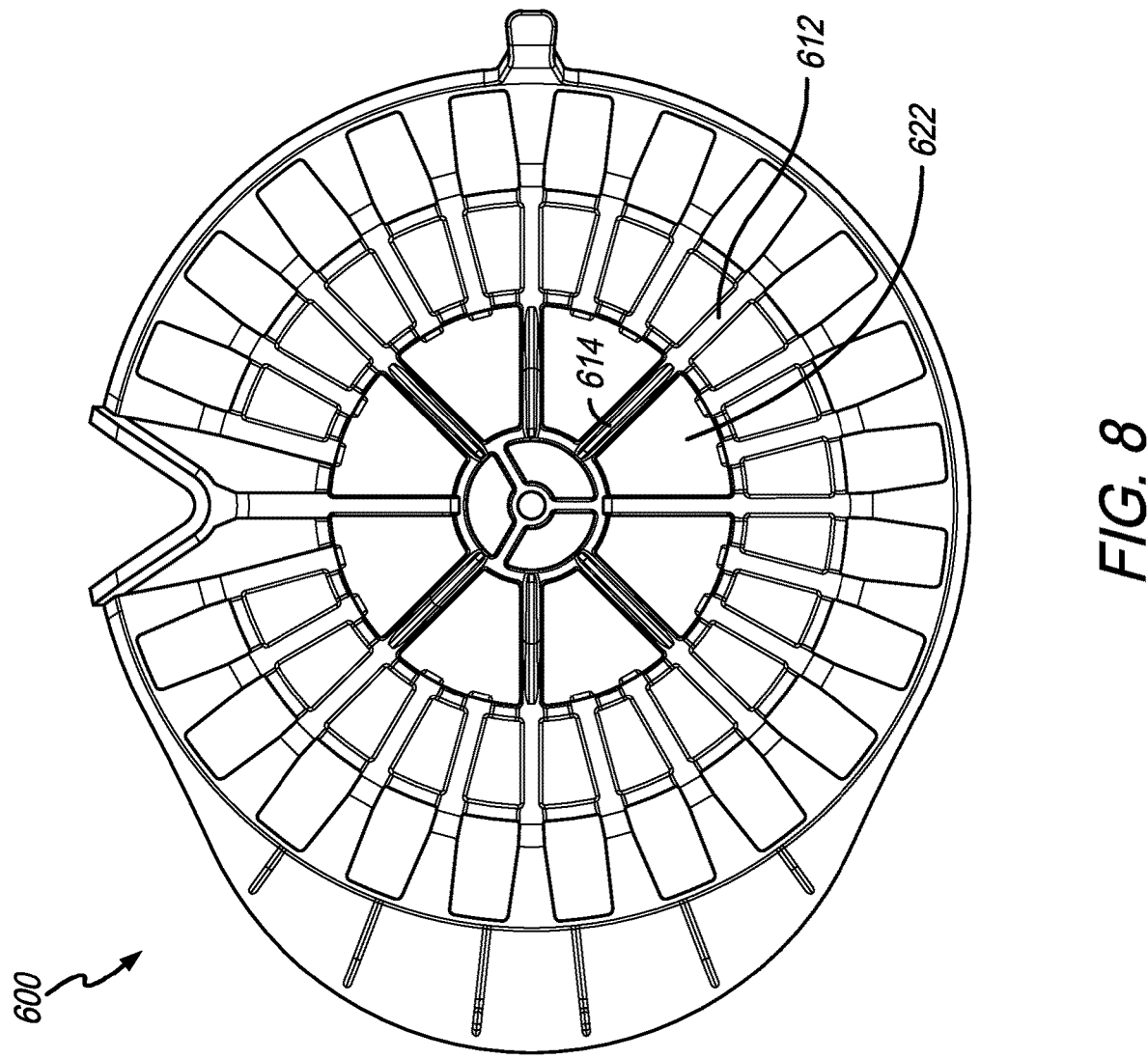
FIG. 8 is an elevational view of the funnel structure.

Referring now to FIG. 8, an overhead view of the beverage brewing funnel structure 600 depicts the geometry formed by the series of fins 614 on a number of the ribs 612. In series, the fins 614 provide a prominently raised area towards the center of the base 622. Specifically, the fins 614 provide a segmented structure that forms a generally cylindrical shape over which a brewing filter may be supported structurally. Further, using a structure 600 that is separate from the funnel 630 allows the brewing filter to have a degree of distance from the funnel 630.

The invention claimed is:

1. A beverage brewing funnel having a structure for supporting a filter paper inserted therein, comprising:
   a frame including a base and a sidewall, the sidewall extending continuously around the beverage brewing funnel and upwardly from the base and defining a mouth;
   a drain aperture extending through a bottom surface of the base; and
   a plurality of ribs integrally formed and protruding from the sidewall and spaced apart from one another, each rib having a portion radially and inwardly positioned along the sidewall, and at least one of the portions having a fin thereon, the fin projecting upwardly and prominently from the portion;
   wherein at least the plurality of ribs having a portion positioned proximate the drain aperture are comprised of a steep side positioned along the rib proximate the drain aperture and extending upwardly from the drain aperture, a sloped portion of the rib spaced away from the steep side toward the sidewall, and a plateau extending between the steep side and the sloped portion; and
   wherein the fins form a raised central area relative to the frame.

2. The beverage brewing funnel of claim 1, wherein the plateau of each fin is generally horizontally oriented.

3. The beverage brewing funnel of claim 1, wherein the sloped portion is generally curved concavely inwardly away from the sidewall.

4. The beverage brewing funnel of claim 1, wherein the plurality of fins approximate a form of a generally cylindrical structure relative to the frame spaced inwardly away from the sidewall and radially surrounding and spaced away from the drain aperture.

5. A beverage brewing funnel apparatus having a structure for supporting a filter paper inserted therein, comprising:
   a brewing funnel;
   a funnel structure nestable within the brewing funnel, the funnel structure comprising:
      a frame including a base and a wall, the wall extending continuously around the brewing funnel and upwardly from the base and defining a mouth;
      a drain aperture extending through a bottom surface of the base; and
      a plurality of ribs integrally formed and protruding from the wall and spaced apart from one another, each rib having a portion radially and inwardly positioned along the wall, and at least one of the portions having a fin thereon, the fin projecting upwardly and prominently from the portion, neighboring pairs of ribs along the wall being spaced apart and defining open spaces therebetween extending through the wall;
   wherein at least the plurality of ribs having a portion positioned proximate the drain aperture are comprised of a steep side positioned along the rib proximate the drain aperture and extending upwardly from the drain aperture, a sloped portion of the rib spaced away from the steep side toward the wall of the funnel structure, and a plateau extending between the steep side and the sloped portion; and
   wherein the fins form a raised central area relative to the frame.

6. The beverage brewing funnel apparatus of claim 5, wherein the funnel structure is formed of a molded plastic material that is smaller in dimension relative to the brewing funnel to facilitate nested positioning of the funnel structure within the brewing funnel during use.

7. The beverage brewing funnel apparatus of claim 5, wherein the brewing funnel is formed of a stainless steel material.

8. The beverage brewing funnel apparatus of claim 5, wherein the plateau of each fin is generally horizontally oriented.

9. The beverage brewing funnel apparatus of claim 5, wherein the sloped portion is generally curved concavely inwardly away from the wall of the funnel structure.

10. The beverage brewing funnel apparatus of claim 5, wherein the plurality of fins approximate a form of a generally cylindrical structure relative to the funnel structure spaced inwardly away from the wall of the funnel structure and radially surrounding and spaced away from the drain aperture.

11. A beverage making apparatus comprising:
   a beverage brewing funnel for supporting a filter paper inserted therein to retain a beverage brewing substance used during a beverage brewing process, the beverage brewing funnel comprising a frame including a base and a wall extending continuously around the beverage brewing funnel and upwardly from the base and defining a mouth, a drain aperture extending through a bottom surface of the base, and a plurality of ribs integrally formed and protruding from the sidewall and spaced apart from one another, each rib having a portion radially and inwardly positioned along the sidewall, and at least one of the portions having a fin thereon, the fin projecting upwardly and prominently from the portion, neighboring pairs of ribs along the wall being spaced apart and defining open spaces therebetween extending through the wall;

wherein at least the plurality of ribs having a portion positioned proximate the drain aperture are comprised of a steep side positioned along the rib proximate the drain aperture and extending upwardly from the drain aperture, a sloped portion of the rib spaced away from the steep side toward the wall of the funnel structure, and a plateau extending between the steep side and the sloped portion;

wherein the fins form a raised central area relative to the frame.

* * * * *